Dec. 11, 1923.
S. B. NEWBERRY
1,477,517
APPARATUS FOR BURNING CEMENT MATERIAL
Filed Feb. 5, 1921
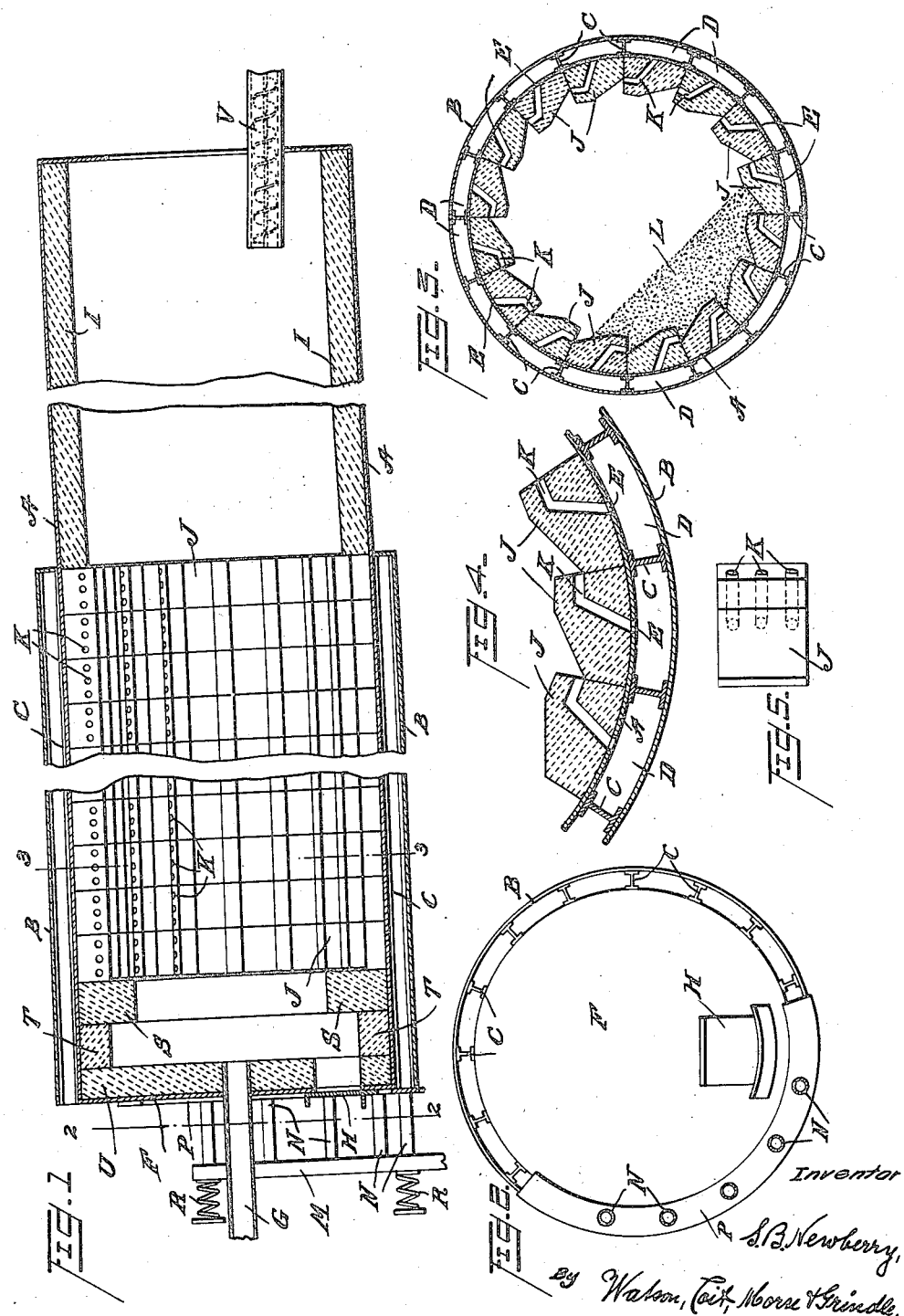

Patented Dec. 11, 1923.

1,477,517

UNITED STATES PATENT OFFICE.

SPENCER B. NEWBERRY, OF CLEVELAND, OHIO; ANDREW W. NEWBERRY EXECUTOR OF SAID SPENCER B. NEWBERRY, DECEASED, ASSIGNOR OF ONE-HALF TO ANDREW W. NEWBERRY AND ONE-HALF TO ARTHUR C. NEWBERRY.

APPARATUS FOR BURNING CEMENT MATERIAL.

Application filed February 5, 1921. Serial No. 442,762.

*To all whom it may concern:*

Be it known that I, SPENCER B. NEWBERRY, a citizen of the United States, and resident of Cleveland, county of Cuyahoga, State of Ohio, have invented certain new and useful Improvements in Apparatus for Burning Cement Material, of which the following is a specification.

This invention relates to the calcination of cement raw material by the heat of combustion of admixed fuel. In the ordinary process of burning cement in rotary kilns the fuel is blown into the kiln with air, and the ash of the fuel is largely deposited on the surface of the lumps of clinker, injuring the quality of the cement produced and causing the clinker to adhere together and to form rings in the kiln. Grinding the fuel with the raw materials overcomes these drawbacks, but it has been found impossible to burn such mixtures successfully in kilns of ordinary type, owing to lack of free contact of the fuel with the air necessary for its combustion. Since the air occupies the open central portions of the kiln the fuel burns only at the surface of the charge and in a flickering flame of low intensity; much heat is lost and the temperature necessary for clinkering is not produced. I have found that to burn admixed fuel effectively it is essential that the full supply of air for rapid and complete combustion of the fuel shall be forced through the mass of material, and that if this is accomplished a very intense heat is developed and a marked economy of fuel is secured.

The use of admixed fuel, finely ground with the raw materials, has the important advantage that the ash of the fuel forms part of the raw mixture, replacing all or part of the argillaceous matter required, and produces none of the bad effects on the product or operation of the kiln which result from the ash of fuel as ordinarily employed. An added advantage of this method is that it permits the use of low-grade fuels, high in ash and low in volatile combustible matter, such as anthracite culm and coke breeze. Since both the combustible and the ash are required in the cement industry, waste products such as coal shale, bone coal, etc., containing as much as 40 per cent of ash and useless for practically all other purposes, may be successfully employed.

The requirement that a rapid current of air shall be forced through the mixture during the calcination has made it necessary to design burning apparatus of a new type, adapted to the purpose in view. In an application filed by me, January 24th, 1921, Serial No. 439,486, I have described a novel vertical kiln of small dimensions combined with a rotating nodulizing apparatus, for the effective burning of cement mixtures containing admixed fuel. The simplicity of the rotary kiln, however, and the present equipment of practically all cement factories with apparatus of this type, have led me to devise an interior construction and mode of operation of such kilns by which the necessary penetration of air through the charge and complete burning of the admixed fuel with development of intense heat may be effected.

The special construction of the rotary kiln used in this process and constituting a part of the invention is shown in the accompanying drawing.

In the drawings:

Figure 1 is a central vertical section through the kiln constituting a part of the invention.

Figure 2 is an end view of the kiln, the inlet pipes being in section on the line 2—2 of Fig. 1.

Figure 3 is a transverse section on the line 3—3 of Figure 1.

Figure 4 is an enlarged section of a portion of the kiln similar to Figure 3; and Figure 5 is a detached plan view of one of the refractory bricks constituting the lining of the lower portion of the kiln.

The steel shell of the kiln, A, A, is encircled in the lower part of its length by an outer shell B B, separated from the shell A A by an annular space. The outer shell is attached to the inner shell by the I beams C C, shown in Figures 2, 3 and 4, which divide the annular space between the shells into the chambers D D. The part of the inner shell encircled by the outer shell is perforated by rows of holes E E, each row extending the length of each channel or chamber. The lower end of the inner shell is closed by the circular plate F, in the center of which is an opening through which passes the pipe G, through which coal-dust and air can be blown if desired in starting up the kiln or as a supplement to the admixed fuel. In the lower part of the plate F is also a door H, so arranged as to be lifted and closed again, by simple mechanism not shown in the drawing, when by the revolution of the kiln it is brought to its lowest position.

The upper portion of the kiln, beyond the part encircled by the outer shell B, is provided with an internal lining I I of ordinary fire brick. In the lower portion the inner shell is lined with refractory brick J J of special design, shown in cross-section in Figures 3 and 4, and also in plan view in Figure 5. This brick is provided with tubular air-passages K corresponding to the apertures E in the inner shell. When the kiln is revolving in a clock-wise direction the charge of raw material and clinker occupies approximately the position shown at L in Figure 3. The air-passages K in the brick J are so designed that the portion of the passage next to the clinker is inclined downward or lies in a horizontal position while under the clinker, in order that the clinker shall not fall down these passages into the channels D D. It will be noted because of the form and arrangement of the adjacent rows of brick J constituting the refractory lining there are longitudinal depressions between the rows, one wall being substantially radial and the other wall at a considerable incline, and that the discharge ends of the passageways K enter the depressions near the bottom and are inclined slightly out towards the periphery.

In front of the kiln is a curved air-main M, leading to a number of air-pipes N N which terminate in the curved plate P. This plate is held closely against the face of the kiln by pressure of the springs R R or by other equivalent device. The position of the plate P is such that during operation it covers the ends of those channels D D which are opposite or under the charge of clinker being treated, whereby the openings E in plate A and connecting air passages K in the lining leading from those channels will be in position to discharge air up through the material being treated. The plate P does not rotate and as the ends of the channels D D successively come in contact with it and move along it during the rotation of the kiln, they are supplied with air under pressure from pipes N N. It will be noted that the rotation of the kiln subjects the material in it to a rolling and tumbling action which agitates it while air in closely adjacent jets is forced through all parts of it.

It will be understood that although in the form shown the shell B and I beams C forming with shell A the channels D D are placed on the outside of shell A, those channels may be formed in other ways without departing from this feature of the invention in its broader aspects so long as those channels surround the kiln and discharge into the material being treated in the kiln.

The kiln is mounted on rollers and driven by gearing, not shown in the drawing, in the usual manner. The upper end communicates with a stack or with the waste-heat boiler according to well known practice. The mixed raw material and fuel enter through the conveyor V. At the lower end of the kiln the lining of perforated brick J terminates in a solid ring of firebrick S S of considerably greater height than the lining J, the purpose of which is to hold back the material being treated and maintain a layer of charge of considerable depth over the perforated lining. Beyond this is a short space lined with solid brick T T, of the same thickness as the lining J J in the upper part of the kiln. The end plate F is protected by the firebrick lining U, in which are openings for the pipe G and the door H.

The two sections of the kiln may be of such relative lengths as are found suitable for the materials and fuel employed; for example, in a kiln 100 feet or more in total length, 30 feet of perforated lining J will generally be found sufficient, corresponding to the length of the burning zone in ordinary rotary kilns.

The purpose of the special construction above described is to permit a vigorous blast of air, blown in through the blast pipe M, the air pipes N N, and the channels D D, to pass through the perforations of the brick J in separated jets and enter the kiln underneath the mass of material, and thus to penetrate all parts of the charge and maintain rapid and intense combustion of the fuel. It will be noted that by the arrangement shown only such of the channels D D as are under the charge at a given moment are under air pressure. Entrance of air into the kiln without passing through the charge of material and fuel is thus avoided. It is understood that the means here described of introducing and distributing through the charge the air required for the burning of the fuel is only one of several equivalent devices which may be employed to accomplish the same purpose.

The operation of the kiln is as follows:

The lower part of the interior is first brought to at least a red heat by the combustion of coke or coal introduced through the conveyor V or by blowing in coal dust, gas or oil through the pipe G. The mixture of raw material and fuel is then continuously supplied through the feed conveyor V and in its passage through the upper portion of the kiln the mixture, if a wet slurry, is dried and forms itself into rounded nodules; if in the form of dry powder containing fluxing agents a similar nodulizing action takes place. The nodulizing may also be done by mixing the ground materials with a small percentage of water or other liquid substance and compressing the mixture into small solid units which are fed into the kiln at its upper end by known means. In consequence of the small excess of oxygen in the gases, little or no combustion of the fuel occurs in the upper part of the kiln and the mixture is merely heated to a temperature above the point of ignition of the fuel. The heated and nodulized mixture then passes through the zone lined with the perforated brick J and is subjected to a strong blast of air which enters from the main M, passes through the pipes N N, the channels D D, and the passages K K in the bricks J. The volume of air supplied is sufficient to quickly and completely burn the admixed fuel, developing an intense heat and converting the mixture into clinker by the time it reaches the ring S. Flowing over this ring the clinker collects in the space above the lining brick T and is discharged at each revolution of the kiln at the momentary raising of the door H into a chute not shown in the drawing. The clinker is then ground to powder. The current of air through the channels and passages in addition to supporting combustion serves to cool the brick and thus prevent their corrosion by the hot clinker, also to save much of the heat ordinarily lost by radiation from the shell.

Having thus described my invention, what is claimed as new and desired to be secured by Letters Patent is:

1. A rotary kiln provided with a refractory lining containing passageways therethrough closely adjacent throughout a material portion of its length and means for simultaneously forcing air under pressure through that series of passageways which at the time occupies a position at that bottom portion of the kiln on which the material being treated normally lies, the inner ends of said passageways pointing to the rear on the line of movement whereby the material being treated will not enter them through the action of gravity.

2. A rotary kiln provided with a refractory lining containing passageways therethrough and means for forcing air under pressure through said passageways into said kiln, the inner ends of said passageways being at substantially right angles to radial planes through them and facing the rear on the line of movement so as to prevent particles of the material being treated from entering them or clogging them through gravity.

3. A rotary kiln having a lining of refractory material provided with depressions at intervals with one wall in a substantially radial plane and having air inlet passageways discharging into said depressions near the bottom through said radial wall with their discharge ends directed slightly out towards the periphery of the kiln, and means for forcing air through said passageways.

4. A rotary kiln provided in its lower part with an inner and an outer cylindrical casing separated from each other having an air space divided longitudinally into air channels, and a refractory lining containing air passages in open communication with and leading from the channels through the lining to the interior of the kiln.

5. A rotary kiln provided in its lower part with an inner and outer cylindrical casing separated by air channels, and a refractory lining containing air passages leading from the channels through the lining to the interior of the kiln, these air passages so placed that their inner orifices shall point in a direction not above horizontal through the part of the revolution of the kiln in which the orifices are covered by the charge of material.

6. A rotary kiln comprising concentric cylindrical casings spaced apart, the inner casing having perforations for the passage of air, means separating the chamber formed between the casings into longitudinal channels open at one end, means for closing the end of the inner cylinder and thus the end of the kiln, a refractory lining in said kiln having air passages therethrough registering with the perforations in said inner casing, the inner ends of said passageways pointing at an angle downwardly when under the material being treated and means for supplying air under pressure to the channels in turn as they reach a position under the material being treated.

7. A rotary kiln having an upper portion lined with imperforate refractory material, means for feeding material to be treated into its upper end, a lower portion having a refractory lining containing air passageways therethrough with their inner ends pointing at a downward angle when under the material being treated, means for passing air through the casing or shell of said lower portion and through said passageways in said lining within the space occupied by the material being treated, and thus up through the material, an inwardly projecting ring of refractory material at the lower end of the portion having the air passageways, a closure for the lower end of the kiln beyond said ring provided with a door for the removal of the treated material.

8. A rotary kiln having a lining composed of a series of symmetrical refractory brick having side surfaces in contact in radial planes, the inner surface of each brick being inclined outwardly to one side surface, thus forming with the adjacent brick an interior depression in the lining extending longitudinally of the kiln, each brick having a passageway extending inwardly from its outer margin and at its inner end laterally through its radial side surface in the depression formed between it and the adjacent brick and means for forcing air through said passageways.

9. A rotary kiln comprising in combination two concentric cylindrical casings forming a space between them, means closing one end of said space, means extending longitudinally connecting said casings at regular intervals peripherally forming separate longitudinal air channels, a lining composed of refractory brick, each having a width corresponding to that of an air channel and adjacent bricks being in contact on radial planes through the margins of said channels, the inner surface of each brick being inclined outwardly to one radial side surface forming a depression and each having therein a passageway leading from an opening in said inner casing inwardly and then laterally through its side surface in said depression and means for supplying air under pressure to said air channels throughout a predetermined portion of the lower part of the kiln.

In testimony whereof I affix my signature.

SPENCER B. NEWBERRY.